United States Patent
Scott, III

(10) Patent No.: US 11,148,499 B2
(45) Date of Patent: Oct. 19, 2021

(54) AIR REAR SUSPENSION SYSTEM FOR AUTOMOBILE

(71) Applicant: Wallace Gerald Scott, III, Sullivan, MO (US)

(72) Inventor: Wallace Gerald Scott, III, Sullivan, MO (US)

(*) Notice: Subject to any disclaimer, the term of this patent is extended or adjusted under 35 U.S.C. 154(b) by 77 days.

(21) Appl. No.: 16/678,380

(22) Filed: Nov. 8, 2019

(65) Prior Publication Data

US 2021/0138865 A1    May 13, 2021

(51) Int. Cl.
| | |
|---|---|
| *B60G 17/04* | (2006.01) |
| *B60G 7/00* | (2006.01) |
| *B60G 11/27* | (2006.01) |
| *B60G 9/02* | (2006.01) |

(Continued)

(52) U.S. Cl.
CPC ............. *B60G 17/04* (2013.01); *B60G 7/001* (2013.01); *B60G 9/02* (2013.01); *B60G 11/27* (2013.01); *B60G 15/08* (2013.01); *B60G 17/056* (2013.01); *B60G 2200/32* (2013.01);

(Continued)

(58) Field of Classification Search
CPC ...... B60G 17/04; B60G 17/056; B60G 11/27; B60G 7/001; B60G 15/08; B60G 9/02; B60G 2500/201; B60G 2200/34; B60G 2300/27; B60G 21/04; B60G 21/045; B60G 21/05

See application file for complete search history.

(56) References Cited

U.S. PATENT DOCUMENTS 2,005,513 A * 6/1935 Weaver .................. B60G 11/14
                                                                  267/253
2,137,662 A * 11/1938 Alvarez .................. B60G 17/04
                                                                  267/256

(Continued)

FOREIGN PATENT DOCUMENTS

| CH | 347718 A | * | 7/1960 | ............. B60G 17/04 |
| DE | 1265600 B | * | 4/1968 | ............. B60G 17/04 |

(Continued)

OTHER PUBLICATIONS

Machine Translation of EP1512560 (Year: 2004).*
Entry from SummitRacing.com Printed Catalog, Nov.-Dec. 2019, p. 269 (1 page).

*Primary Examiner* — Ruth Ilan
*Assistant Examiner* — Kurtis Nielson
(74) *Attorney, Agent, or Firm* — Lewis Rice LLC

(57) ABSTRACT

A system for suspending an automobile using an air rear suspension is provided. The system may include an automobile having a body, a front axle, and a rear axle; a linkage bar connected to said body and to said rear axle, wherein said connections allow for relative movement between said body and said rear axle; a cantilever bar having a first cantilever end and a second cantilever end; a damper; and an air spring, wherein said cantilever bar is connected to each of said rear axle and said body at said first cantilever end, wherein said cantilever bar is connected to each of said damper and said air spring at said second cantilever end, wherein said damper and said air spring are each connected to said body, and wherein said linkage bar and said cantilever bar are each configured to move in response to movement of said rear axle relative to said body.

16 Claims, 5 Drawing Sheets

(51) Int. Cl.
  *B60G 15/08* (2006.01)
  *B60G 17/056* (2006.01)

(52) U.S. Cl.
  CPC .... *B60G 2200/34* (2013.01); *B60G 2202/152* (2013.01); *B60G 2300/27* (2013.01); *B60G 2500/201* (2013.01)

(56) References Cited

U.S. PATENT DOCUMENTS

| | | | | |
|---|---|---|---|---|
| 2,309,811 A | * | 2/1943 | Utz | B60G 3/06 |
| | | | | 280/124.179 |
| 2,349,175 A | * | 5/1944 | Kolbe | B60G 21/007 |
| | | | | 280/124.103 |
| 2,770,468 A | * | 11/1956 | Willingham | B60G 9/00 |
| | | | | 280/124.106 |
| 3,592,485 A | * | 7/1971 | Buhl | B60G 21/073 |
| | | | | 280/6.159 |
| 4,146,109 A | * | 3/1979 | Barth | B62D 7/00 |
| | | | | 180/420 |
| 5,577,571 A | * | 11/1996 | Rizzoli | B60G 3/20 |
| | | | | 180/291 |
| 5,833,269 A | * | 11/1998 | Gastesi | B62D 21/04 |
| | | | | 280/785 |
| 5,878,828 A | * | 3/1999 | Ooley | B62D 35/007 |
| | | | | 180/55 |
| 6,167,361 A | * | 12/2000 | Bristow | B60G 7/00 |
| | | | | 703/1 |
| 6,193,005 B1 | | 2/2001 | Jurrens | |
| 6,733,022 B2 | | 5/2004 | Bradshaw et al. | |
| 7,500,687 B2 | | 3/2009 | Dare-Bryan | |
| 7,748,721 B2 | | 7/2010 | Verbowski | |
| 8,342,548 B1 | | 1/2013 | Vey et al. | |
| 8,888,113 B2 | | 11/2014 | Dyar | |
| 9,174,504 B1 | * | 11/2015 | Powell | B60G 7/003 |
| 2006/0027990 A1 | * | 2/2006 | Dobson | B60G 21/073 |
| | | | | 280/124.106 |
| 2008/0042390 A1 | * | 2/2008 | Geslin | B60G 7/02 |
| | | | | 280/124.1 |
| 2009/0230650 A1 | * | 9/2009 | Mayen | B60G 7/001 |
| | | | | 280/124.1 |
| 2016/0159180 A1 | * | 6/2016 | Palatov | B60G 13/18 |
| | | | | 280/5.507 |
| 2020/0094639 A1 | * | 3/2020 | Tiramani | B60G 7/001 |
| 2020/0094641 A1 | * | 3/2020 | Tiramani | B60G 7/02 |
| 2020/0290423 A1 | * | 9/2020 | Wang | B60G 17/0157 |

FOREIGN PATENT DOCUMENTS

| | | | | |
|---|---|---|---|---|
| DE | 1780066 A1 | * | 2/1972 | ............ B60G 17/04 |
| DE | 102015110744 A1 | * | 1/2016 | ............ B60G 17/00 |
| DE | 102016001594 B3 | * | 7/2017 | ............ B60G 21/05 |
| EP | 1512560 A2 | * | 3/2005 | ............ B60G 11/50 |
| JP | 2014162376 A | * | 9/2014 | ............ B60G 3/20 |
| WO | WO-2013072873 A2 | * | 5/2013 | ........ B60G 21/0553 |

* cited by examiner

AIR REAR SUSPENSION SYSTEM FOR AUTOMOBILE

BACKGROUND

1. Field of the Invention

This disclosure is related to the field of vehicle suspensions, and more specifically to a vehicle suspension system that uses a cantilevered air spring and shock absorber system to suspend a vehicle.

2. Description of the Related Art

Nearly all vehicles employ some form of a suspension. Vehicle suspensions suspend a vehicle's body relative to its wheels with the general purpose of allowing the vehicle's body to move smoothly with reduced shock while maintaining contact between the wheels and the road surface. Nearly every four-wheeled vehicle, including automobiles, uses such a suspension system. In fact, precursors to the automobile, including horse- or ox-drawn carts, used suspensions to allow for relative movement between the wheels of the vehicle and the vehicle body, thereby reducing shock felt by the vehicle body and its occupants. Modern vehicles also typically use a suspension to manage the movement of the vehicle's body as the vehicle moves, relatively rapidly, over rough and/or uneven ground.

Vehicle suspensions are often designed to provide a compromise between two competing interests: vehicle handling and ride quality. It is important for any vehicle that the suspension maintain contact between the wheels of the vehicle and the road surface. It is also important to isolate the vehicle's body from the potentially strong forces exerted on the wheels by the road. Automobile suspensions typically have two portions: (a) a front suspension that connects the automobile's front two wheels and axle(s) to the vehicle's body, and (b) a rear suspension that connects the automobile's rear two wheels and axle(s) to the vehicle's body. The front suspension and rear suspension typically have differing designs, at least because the front wheels are typically responsible for steering. Further, in rear wheel drive automobiles, the rear wheels are responsible for supplying forward movement forces.

In all cases, suspensions typically include two principal components: springs and dampers. The springs supply an ability to absorb and store potential energy, while the dampers supply an ability to remove energy from the suspension. Said another way, springs allow the suspension to temporarily absorb bumps and to force the wheels downward when entering a depression, and dampers control the spring's motion, ensuring that the suspension will return to normal quickly after experiencing shock from a bump or depression. Also included in suspensions are the pneumatic tires used by a majority of automobiles and similar vehicles, as well as linkages that connect the vehicle to its wheels and allow for relative movement between the vehicle body and the wheels.

Vehicle suspensions are very important in automobile racing. A race car requires consistent contact between the wheels and the road in order to accelerate and to navigate around turns. In some forms of racing, such as drag racing, the suspension's ability to maintain contact with the road under extreme forward acceleration (and at relatively high speeds) is paramount. Drag racing is a type of racing wherein automobiles compete, usually two at a time, to be the first to cross a finish line at the end of a straight track after a set distance, such as a quarter of a mile or an eighth of a mile. The race typically begins with a standing start, and the competitors typically accelerate forward very quickly, finishing the race at a high speed. For drag racing automobiles, the suspension is often designed to resist squat, or the tendency of an automobile to lean backwards and downwards under high forward acceleration. This typically causes increased forces being carried by the rear suspension during forward acceleration. In any case, the suspension in a drag racing automobile is likely to be focused on handling the particular stresses experienced by the suspension during a drag race.

For rear suspensions, typically the spring function is provided by a metal coil (or metal leaf) spring, and the damping function is provided by a dashpot, sometimes known as a damper. As discussed above, the spring provides energy storage. In an automobile suspension, the spring also typically provides a normal ride height above the relevant axle while absorbing or releasing energy as the wheels are subjected to changes in the road. The damper converts that absorbed or released energy into other forms, such as friction and heat, reducing the effects of any changes on the body of the vehicle. In all automobiles, the springs and dampers are chosen to provide the desired ride height and to perform for the anticipated forces that the vehicle will be subjected to during operation. Performance automobiles typically have heavier springs, or springs having larger spring rates per vehicle weight, to support the anticipated higher forces due to relatively high operating speeds. For drag cars, these forces typically entail extreme forward acceleration.

Some automobiles have substituted air springs for the typical metal coil springs. Air springs are springs that rely on the compressibility of air (or any other gas) to provide a spring function. Typically, the air is enclosed in body in the form of a cylinder, a bladder, or another container. When compressed, the air and the body store potential energy, much like a metal spring, which rely on potential energy being stored in the elastic deformation of the spring. One difference between metal coil springs and air springs is that the spring rates of metal coil springs are relatively more linear than the spring rates of air springs, which spring rates typically increase greatly as the air is compressed. Further, air springs may be easily adjusted by varying the volume of air used in the fixed-volume air spring body. Air springs may also be adjusted by altering the stroke range of the air spring—which is the positioning and distance between the air spring's connection points to the automobile at full extension and at full compression. Adjusting this range may also be considered to be adjusting the air spring's preload, which is related to the amount of reduction made to the suspension's stroke range when the related vehicle is at rest.

Current air spring systems suffer from a number of problems. First, air spring systems are not frequently utilized in drag racing automobiles. As a result, persons of ordinary skill have yet to design efficient systems that can reliably and effectively suspend an automobile under extreme forward acceleration. This is especially true for automobile rear suspensions. Further, prior air rear suspension systems have been constrained in the positioning of the air springs and related linkages, principally only having the air springs oriented to compress in the vertical direction. Similarly, prior air spring systems have been limited in their adjustability. For example, prior systems have been constrained to only using air volume to adjust, without any ability to adjust the preload otherwise.

SUMMARY OF THE INVENTION

The following is a summary of the invention, which should provide to the reader a basic understanding of some aspects of the invention. This summary is not intended to identify critical elements of the invention or, in any way, to delineate the scope of the invention. The sole purpose of this summary is to present in simplified text some aspects of the invention as a prelude to the more detailed description presented below.

Because of these and other problems in the art, described herein, among other things, is a rear suspension system for an automobile, the system comprising: the automobile including a body, a front axle, and a rear axle; a linkage bar connected to the body and to the rear axle, wherein the connections allow for relative movement between the body and the rear axle; a cantilever bar having a first cantilever end and a second cantilever end; a damper; and an air spring, wherein the cantilever bar is connected to each of the rear axle and the body at the first cantilever end, wherein the cantilever bar is connected to each of the damper and the air spring at the second cantilever end, wherein the damper and the air spring are each connected to the body, and wherein the linkage bar and the cantilever bar are each configured to move in response to movement of the rear axle relative to the body.

In an embodiment of the system, the damper and the air spring are connected in parallel between the cantilever bar and the body.

In an embodiment of the system, the cantilever bar has a general U-shape with a flattened valley portion and flared ends, and wherein the flattened valley portion is the second cantilever end and the flared ends are the first cantilever end.

In an embodiment of the system, the system further comprises a preload adjustment bar connected between the cantilever bar and the body, wherein the preload adjustment bar may be configured to adjust the preload of the air spring.

In an embodiment of the system, a distance between the preload adjustment bar and the body may be varied.

In an embodiment of the system, the distance between the preload adjustment bar and the body may be varied by turning a set screw that connects the preload adjustment bar and the frame.

In an embodiment of the system, the damper and the air spring extend in a horizontal direction.

In an embodiment of the system, the rear axle is constrained by the linkage bar to move primarily in the vertical direction.

In an embodiment of the system, the linkage bar includes two upper linkage segments and two lower linkage segments, each of which is connected to each of the body and the rear axle.

In an embodiment of the system, the system further comprises an air valve, wherein the air valve is connected to the body and to the rear axle, and wherein the air valve is configured to substantially maintain a ride height of the body during operation of the automobile by adjusting a volume of air within the air spring.

In an embodiment of the system, the system further comprises a first link, a second link, and a cantilever bracket, wherein the cantilever bar is connected to the rear axle via the first link, the second link, and the cantilever bracket, wherein the cantilever bar and the first link are directly connected, wherein the first link and the second link are directly connected, wherein the second link and the cantilever bracket are directly connected, and wherein the connections between the cantilever bar, the first link, the second link, and the cantilever bracket are configured to allow relative motion between the rear axle and the cantilever bar via rotations at the connections.

In an embodiment of the system, the first link and the cantilever bar are configured such that each may rotate about a cantilever pivot at the connection between the first link and the cantilever bar, such that a rotation of the first link about the cantilever pivot causes a rotation of the cantilever bar about the cantilever pivot.

In an embodiment of the system, the first link and the cantilever bar are formed integrally.

In an embodiment of the system, the rear axle is positioned between the first link and the body.

In an embodiment of the system, the cantilever bar has a general U-shape with a flattened valley portion and flared ends, and wherein the flattened valley portion is the second cantilever end and the flared ends are the first cantilever end.

In an embodiment of the system, the system further comprises a preload adjustment bar connected between the cantilever bar and the body, wherein the preload adjustment bar may be configured by a user to adjust the preload of the air spring.

In an embodiment of the system, a distance between the preload adjustment bar and the body may be varied.

In an embodiment of the system, the distance between the preload adjustment bar and the body may be varied by turning a set screw that connects the preload adjustment bar and the frame.

In an embodiment of the system, the damper and the air spring extend in a horizontal direction.

In an embodiment of the system, the rear axle is constrained by the linkage bar to move primarily in the vertical direction.

DETAILED DESCRIPTION OF THE PREFERRED EMBODIMENT(S)

The following detailed description and disclosure illustrates by way of example and not by way of limitation. This description will enable one skilled in the art to make and use the disclosed structures and methods, and describes several embodiments, adaptations, variations, alternatives, and uses of the disclosed structures and methods. As various changes could be made in the above constructions without departing from the scope of the disclosures, it is intended that all matter contained in the description or shown in the accompanying drawings shall be interpreted as illustrative and not in a limiting sense.

Figure 1:
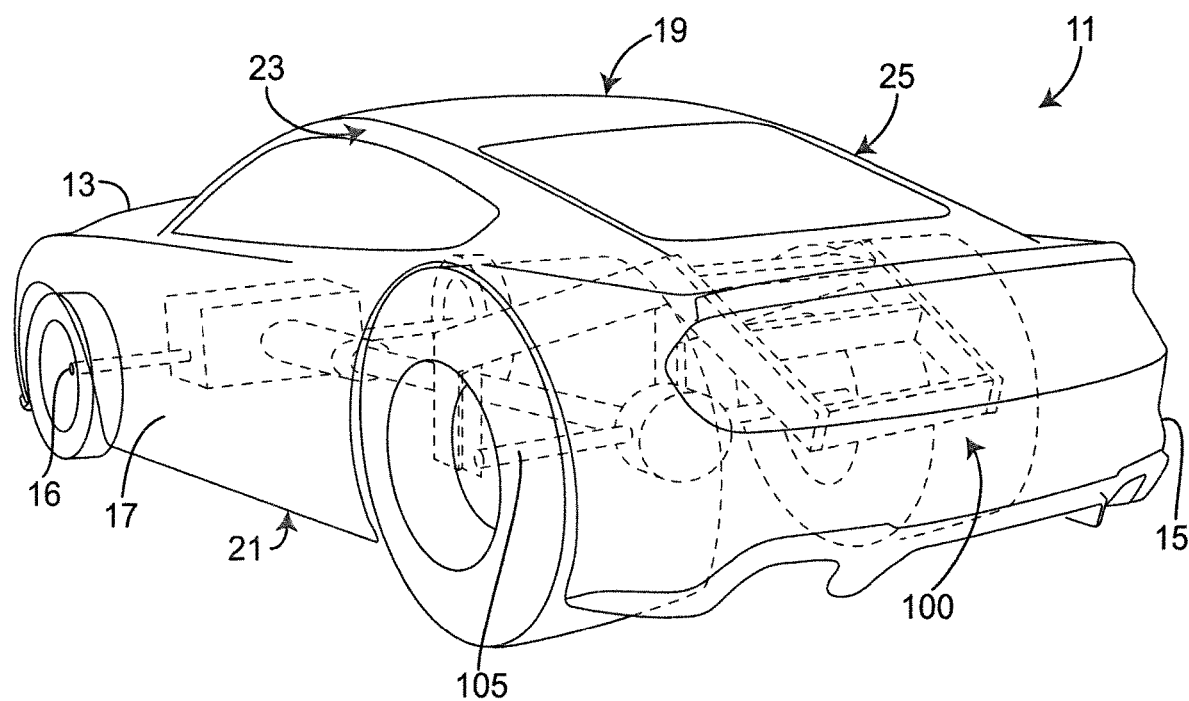
FIG. 1 provides a perspective view of an automobile including an embodiment of an air rear suspension in accordance with this disclosure.

FIG. 1 provides an embodiment of an air rear suspension (100) for an automobile (11). The automobile (11) may be any automobile. In some embodiments, the automobile (11) is an automobile designed specifically for drag racing, also known as a drag car. Typically, the automobile (11) will have a front end (13) and an opposing rear end (15), wherein the front end (13) extends in the same direction as the operator faces when operating the automobile (11). The automobile (11) will also include a top (19) and an opposing bottom (21), wherein the top (19) extends in the opposite direction as the force of gravity when the automobile (11) is oriented with its wheels on the ground. The automobile (11) will also have a first side (23) and an opposing second side (25), wherein the first side (23) extends in the direction that would be an operator's left when operating the automobile (11), as depicted in FIG. 1.

The automobile (11) will typically include two axles, a front axle (16) positioned towards the front end (13) and a rear axle (105) positioned towards the rear end (15), and an engine (not shown in the figures) that is positioned towards the front end (13). The automobile (11) will also typically include a body portion (17) that is not formed integrally with each of the front axle (16) and the rear axle (105). Generally, the body portion (17) is connected to each of the front axle (16) and the rear axle (105). The air rear suspension (100) will typically be positioned proximate to, and connected with, the rear axle (105). The air rear suspension (100) may serve as the link between the rear axle (105) and the body portion (17).

The body portion (17) may include a frame (101). The frame (101) itself typically extends for the front end (13) to the rear end (15). Further, the frame (101), at least in the area around the air rear suspension (100), is symmetrically disposed around the components of the air rear suspension (100), extending in toward both the first side (23) and the second side (25) to the same extent. This extent will typically have the frame (101) end just inside of the interior surfaces of the rear tires of the automobile (11), which are connected to the rear axle (105). This allows for the air rear suspension (100) to have a relatively symmetric layout about a line that extends from the front end (13) to the rear end (15) though the center of the frame (101).

The front axle (16) and the rear axle (105) may have any construction, and may be made of any material or materials, as would be understood by persons skilled in the art. For example, in an embodiment, the front axle (16) and the rear axle (105) may be made of a steel material. Similarly, the body portion (17) and the frame (101) may be made of any material or materials, as would be understood by persons skilled in the art. In an embodiment, the body portion (17) may be made of various materials, including steel, aluminum, glass, rubber, and plastics, and the frame (101) may be made of materials including without limitation steel, aluminum, and carbon fiber.

Figure 2:
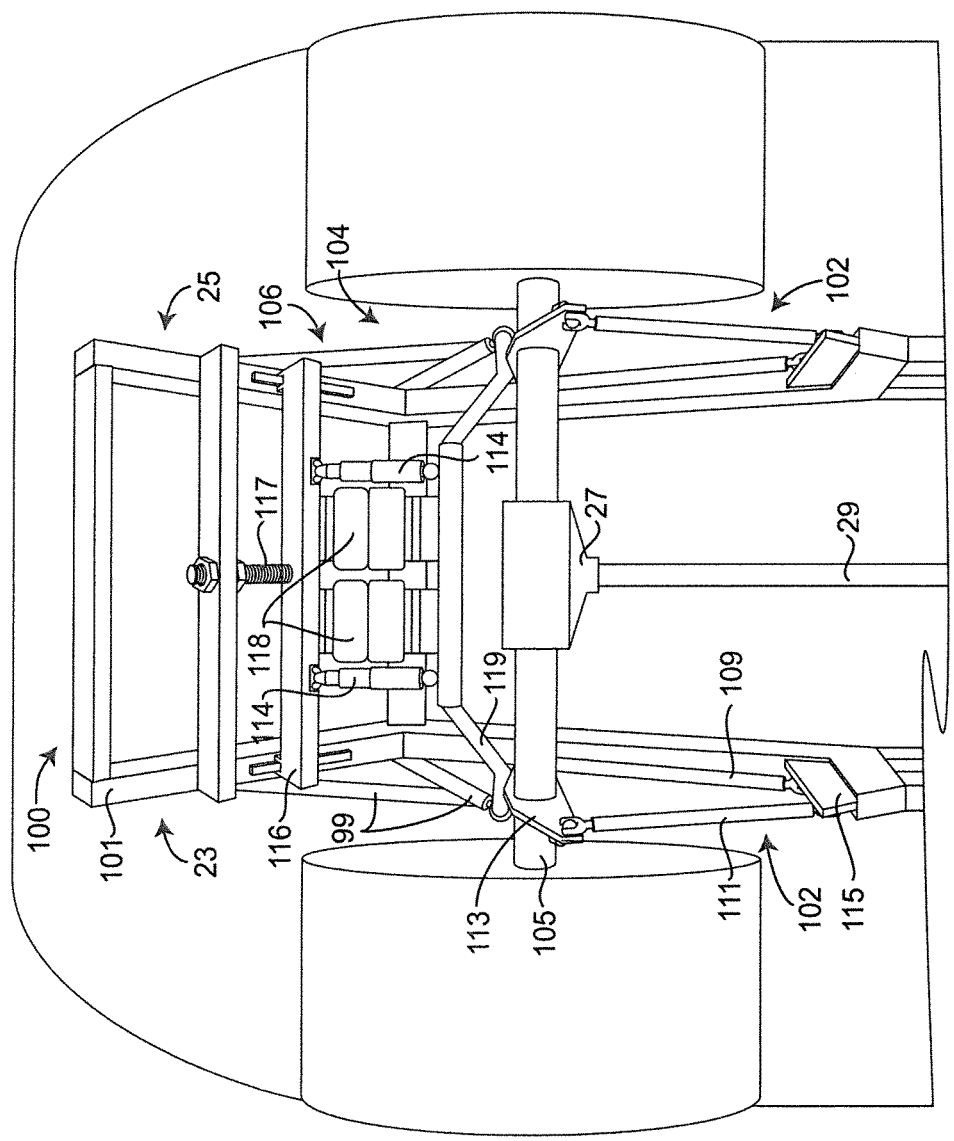
FIG. 2 provides a bottom view of the air rear suspension shown in FIG. 1.
Figure 3:
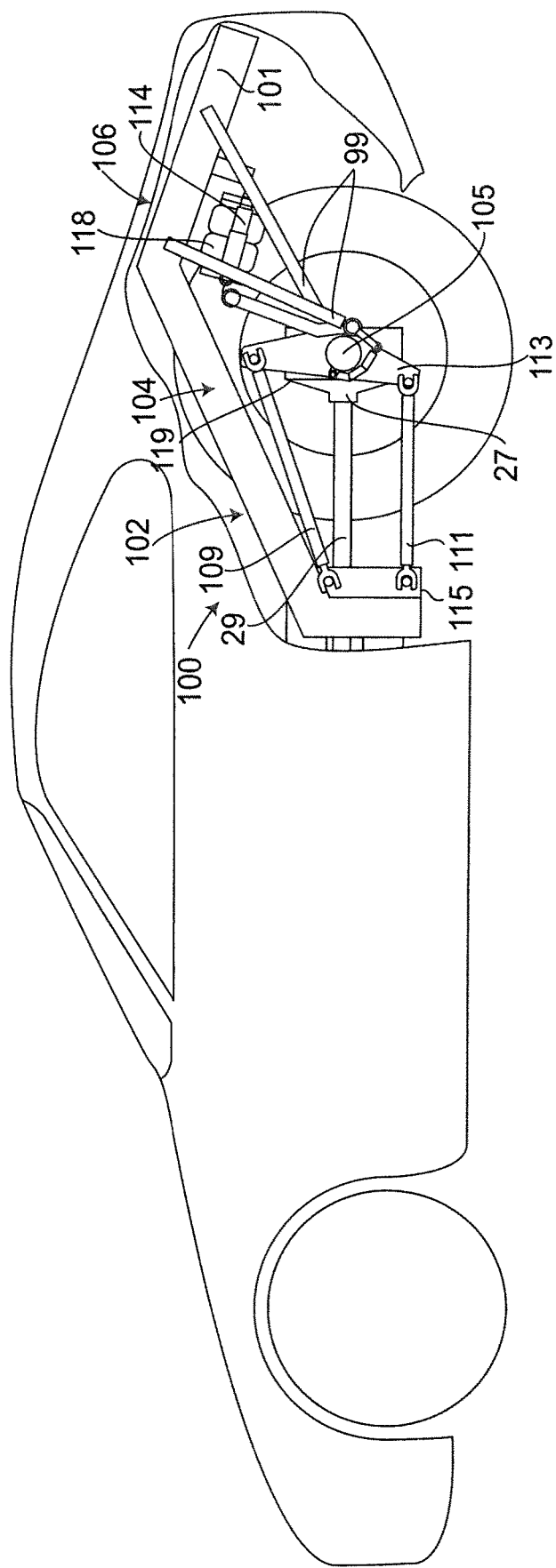
FIG. 3 provides a side view of the air rear suspension shown in FIG. 1.

FIG. 2 depicts the air rear suspension (100) from below the automobile (11). FIG. 3 depict a side view of the air rear suspension (100). As depicted, the air rear suspension (100) includes three subsystems: a linkage bar portion (102), a cantilever bar portion (104), and a shock absorber portion (106). In the depicted embodiment, the linkage bar portion (102) and the cantilever bar portion (104) are each connected to each other at or near the rear axle (105). The cantilever bar portion (104) and the shock absorber portion (106) are connected to each other. The subsystems are typically arranged such that the linkage bar portion (102) is closest to the front end (13), the cantilever bar portion (104) is in between the other two subsystems, and the shock absorber portion (106) is closest to the rear end (15). In the depicted embodiment, each subsystem of the air rear suspension (100), the linkage bar portion (102), the cantilever bar portion (104), and the shock absorber portion (106), is connected to the frame (101) at or near one end of the given portion. Also depicted in FIGS. 2 and 3 are a differential (27) and a driveshaft (29), each of which are carried by, and move with the frame (101).

The air rear suspension (100) generally operates by transferring energy from the movement of the rear axle (105) and the linkage bar portion (102) to the shock absorber portion (106) via the cantilever bar portion (104). As discussed in detail below, the arrangement of the subsystems ((102), (104), (106)) allows for efficient movement of the rear axle (105) relative to the body portion (17). A cantilever bar (119) in the cantilever bar portion (104) responds to movement of the rear axle (105), which movement is constrained by the linkage bar portion (102), by pressing into or pulling the shock absorber portion (106). In turn, the shock absorber portion (106) allows for flexibility and adjustability in the spring and damping characteristics of the air rear suspension (100) by providing tuning options. Further, the use of a cantilever bar (119) provides a space efficient design that allows for a convenient arrangement of the shock absorber portion (106) and its components because the cantilever bar (119) and its connections are capable of translating the vertical or rotational movement of the rear axle (105) into horizontal movement of the shock absorber portion (106). Each of the subsystems will now be discussed in detail.

In the embodiment depicted in the Figures, the linkage bar portion (102) includes two upper linkage arms (109), two lower linkage arms (111), two rear axle connection brackets (113), and two linkage bar frame connection brackets (115). As discussed above, the air rear suspension (100) typically has a symmetric layout about the line that extends from the front end (13) to the rear end (15) though the center of the frame (101). Accordingly, each of the two linkage bar frame connection brackets (115) may be connected to the frame (101) in relatively symmetric positions, one on the first side (23) and the other on the second side (25). One end of an upper linkage arm (109) may be connected to each linkage bar frame connection bracket (115), such that each connection allows each upper linkage arm (109) to pivot around the connection. Similarly, one end of a lower linkage arm (111) may be connected to each linkage bar frame connection bracket (115), such that each connection allows each lower linkage arm (111) to pivot around the connection. The upper linkage arms (109) are positioned at a point on the relevant linkage bar frame connection bracket (115) closer to the top (19), and the lower linkage arms (111) are positioned at a point on the relevant linkage bar frame connection bracket (115) closer to the bottom (21).

Each rear axle connection bracket (113) may be connected to the rear axle (105), one on the first side (23) and the other on the second side (25). Typically, the rear axle (105) is not directly connected to the rear axle connection bracket (113), as the rear axle (105) generally must be free to rotate the rear wheels. Instead, the rear axle (105) is typically enclosed in some manner, and the rear axle connection bracket (113) is connected to that enclosure. In this application, connections will be discussed as being made to the rear axle (105) to simplify the discussion.

One end of an upper linkage arm (109) may be connected to each rear axle connection bracket (113), such that each connection allows each upper linkage arm (109) to pivot around the connection. Similarly, one end of a lower linkage arm (111) may be connected to each rear axle connection bracket (113), such that each connection allows each lower linkage arm (111) to pivot around the connection. As detailed in FIG. 3, each upper linkage arm (109) is positioned at a point on the relevant rear axle connection bracket (113) closer to the top (19), and each lower linkage arm (111) is positioned at a point on the relevant rear axle connection bracket (113) closer to the bottom (21). Further, as depicted in the Figures, each upper linkage arm (109) is the same length as the other upper linkage arm (109), and each lower linkage arm (111) is the same length as the other lower linkage arm (111). This configuration of the linkage bar portion (102) may allow the upper linkage arms (109) and the lower linkage arms (111) to move in response to forces applied to the linkage bar portion (102) by the rear axle (105), for example, when the related automobile (11) travels over a bump in the road on which the automobile (11) is traveling. The rear axle's (105) connection to the linkage bar portion (102) has a tendency to constrain the movement of the rear axle (105) to a primarily vertical sweep, depending on the positioning of the connections of the upper linkage arms (109) and the lower linkage arms (111) to the rear axle connection brackets (113) and the linkage bar frame connection brackets (115). In any case, the movement of the rear axle (105) will be constrained by the linkage bar portion (102).

In other embodiments, the linkage bar portion (102) may be replaced, in whole or in part, with any system that allows for a constraining of the movement of the rear axle (105) relative to the frame (101). For example, in an embodiment, the two upper linkage arms (109) may be combined into a single, integrated unit. In other embodiments, the two lower linkage arms (111) may be combined into a single, integrated unit. In yet other embodiments, the two upper linkage arms (109) and the two lower linkage arms (111) may be combined into a single, integrated unit. In other embodiments, more or less linkage bars may be used. In some embodiments, the linkage bar frame connection brackets (115) may be replaced with direct connections to the frame (101), or with any connection known to persons of ordinary skill in the art. Similarly, in some embodiments, the rear axle connection brackets (113) may be replaced with direct connections to the rear axle (105), or with any connection known to persons of ordinary skill in the art.

The upper linkage anus (109), the lower linkage arms (111), the rear axle connection brackets (113), and the linkage bar frame connection brackets (115) may be made of the same or different materials, and may be made of any material known to persons of skill in the art that are capable of withstanding the forces indecent upon the upper linkage arms (109) and the lower linkage arms (111) while the automobile (11) is operating. Such materials include, without limitation, steel, aluminum, carbon fiber, and other like materials. Similarly, the upper linkage anus (109), the lower linkage anus (111), the rear axle connection brackets (113), and the linkage bar frame connection brackets (115) may be made into any shape or size that allows for the linkage bar portion (102) to move, and to constrain the movement of the rear axle (105), as intended herein. Further, as discussed briefly above, any number of upper linkage arms (109), lower linkage arms (111), rear axle connection brackets (113), and linkage bar frame connection brackets (115) may be used.

In the embodiment depicted in the Figures, the cantilever bar portion (104) includes the cantilever bar (119), two first links (120), and two second links (122). The depicted cantilever bar (119) has a generally U-shape that is arranged with the valley of the "U" extending towards the top (19) and the ends of the "U" arranged on either the first side (23) or the second side (25). The ends of the U-shape may flare outwards, as shown in the Figures. The valley of the "U" is relatively flat, while the ends of the "U" include a bend (beyond any flaring) that moves outward from the center of the cantilever bar (119) towards either the first side (23) or the second side (25). Specifically, the end of the "U" on the first side (23) bends to move further toward the first side (23), and the end of the "U" on the second side (25) bends to move further toward the second side (25). At each end of the "U," the cantilever bar (119) is connected through a first link (120) and a second link (122) to the rear axle (105). At the relatively flat valley of the "U," the cantilever bar (119) is connected to the shock absorber portion (106). Specifically, the relatively flat valley of the "U" of the cantilever bar (119) is connected to one end of each of the dampers (114) and the air springs (118).

Figure 4:
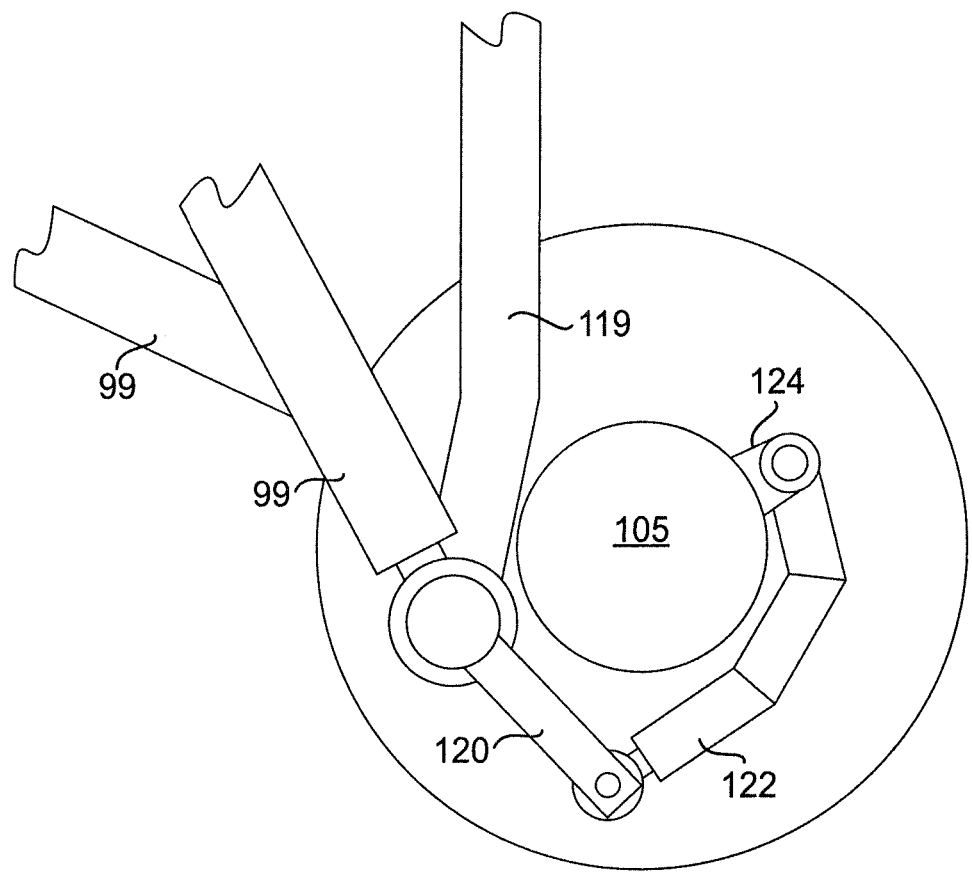
FIG. 4 provides a side view of links connecting a cantilever bar to a rear axle of the air rear suspension shown in FIG. 1.

As shown in FIG. 4, the connections between cantilever bar (119) and each of the two first links (120), one first link (120) being positioned on the first side (23) and the other first link (120) being positioned on the second side (25), may be rigid connections, or connections that limit relative movement between the cantilever bar (119) and each of the first links (120). In some embodiments, the two first links (120) and the cantilever bar (119) may be formed as a single, integrated unit. As shown best in FIGS. 2 and 4, the first link (120) and the cantilever bar (119) meet at an angle and are not parallel in their extent. This angling may provide a moment arm for each of the first link (120) and the cantilever bar (119) for the angles of rotation that these parts are designed to work within during operation. Said another way, the first link (120) and the cantilever bar (119) may be at fixed angles relative to each other about the pivot connection to ensure that neither part interferes with other portions of the rear air suspension (100) or automobile (11) during operation.

On each of the first side (23) and the second side (25), the cantilever bar (119) and the respective first link (120) are also connected, at the point where they connect to each other, to frame extensions (99) on the relative one of the first side (23) and the second side (25). The frame extensions (99) are extensions of the frame (101) that constrain the movement of the cantilever bar portion (104) and provide a fixed pivot for the cantilever bar (119) and first link (120). In some embodiments, these connections between the frame extensions (99), the cantilever bar (119), and the first link (120) will be made using a spherical rod end or other low friction connection known to persons of ordinary skill in the art. The cantilever bar (119) and the first links (120) then may rotate around a pivot formed at this connection. However, the positioning of this pivot will remain constant relative to the frame (101) due to the rigid nature of the frame extensions (99), constraining the movement of the cantilever bar portion (104).

Figure 5:
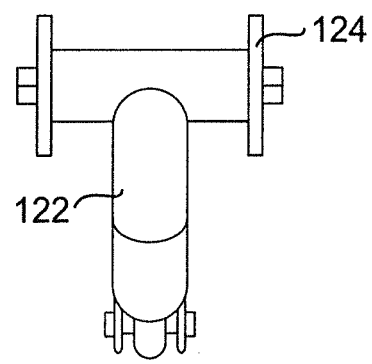
FIG. 5 provides a detailed view of the connection between the links and the rear axle of FIG. 4.

The connections between the first links (120) and the second links (122) may allow either link to pivot around the connection. In some embodiments, these connections will be made using a spherical rod end or other low friction connection known to persons of ordinary skill in the art. The second links (122) are connected to the rear axle (105). In the depicted embodiment, this connection is made at a point on the outside of the rear axle's (105) connection to the rear axle connection bracket (113). In other embodiments, these connections may be made at the same point or at any different points along the rear axle (105). As shown in FIG. 5, each second link (122) is connected to the rear axle (105) via a link bracket (124) that allows for relative rotation of the given second link (122) around a pivot of the given link bracket (124). In the depicted embodiment, the connection between the second link (122) and the link bracket (124) is a T-bar connection. Such a T-bar connection is constrained to move only in a rotational path around the pivot of the link bracket (124). Said another way, this connection is not capable of moving in the direction of either of the first side (23) or the second side (25). Thus, this connection may have the additional benefit of preventing side-to-side movement of the rear axle (105) relative to the frame (101). Further, this connection may have the benefit of preventing independent articulation of either side of the air rear suspension (100). Thus, in the depicted embodiment, the air rear suspension (100) may not require additional sway bars to prevent such side-to-side movement or independent articulation, which may reduce the overall weight of the automobile (11).

The cantilever bar (119), two first links (120), and two second links (122) may be made of the same or different materials, and may be made of any material known to persons of skill in the art that are capable of withstanding the forces indecent upon these parts from the rear axle (105) and/or shock absorber portion (106). Such materials include, without limitation, steel, aluminum, carbon fiber, and other like materials. Any or all of these parts may be constructed as a single, integral unit, providing that the necessary flexibility and abilities to rotate are maintained where needed. Similarly, the cantilever bar (119), two first links (120), and two second links (122) may be made into any shape or size that allows for the translation of movement from the rear axle (105) to the shock absorber portion (106), as intended herein.

In the embodiment depicted in the Figures, the shock absorber portion (106) includes two dampers (114), two air springs (118), and a preload adjustment bar (116). The two dampers (114) and the two air springs (118) are each connected to the valley of the "U" shape of the cantilever bar (119), as explained above. The two dampers (114) and the two air springs (118) are each connected at each part's respective other end to the preload adjustment bar (116). In the depicted embodiment, the dampers (114) are on either side of the air springs (118). Further, in the depicted embodiment, the dampers (114) and the air springs (118) may be arranged to extend and compress in the horizontal direction, which may be the direction of a line passing from the front end (13) to the rear end (15) through the center of the frame (101). This may be a convenient arrangement for the shock absorber portion (106) because it allows for a flatter layout that does not interfere with portions of the automobile (11) below the shock absorber portion (106). In other embodiments, the arrangement of the dampers (114) and the air springs (118) may be any arrangement as would be understood by persons of ordinary skill in the art.

The preload adjustment bar (116) is connected to the frame (101) on ends of the preload adjustment bar (116) on both the first side (23) and the second side (25). In the depicted embodiment, the preload adjustment bar (116) is also connected to the frame (101) on its side that is opposite to the side connected to the dampers (114) and air springs (118). This connection may be made in a way that the relative positioning between the cantilever bar (119) and the preload adjustment bar (116) may be altered by changing the positioning of the preload adjustment bar (116). In the depicted embodiment, the positioning of the preload adjustment bar (116) may be changed by adjusting a set screw (117), which may move the preload adjustment bar (116) towards or away from the cantilever bar (119). In other embodiments, any method of positioning the preload adjustment bar (116) known to persons of ordinary skill in the art may be used.

Figure 6:
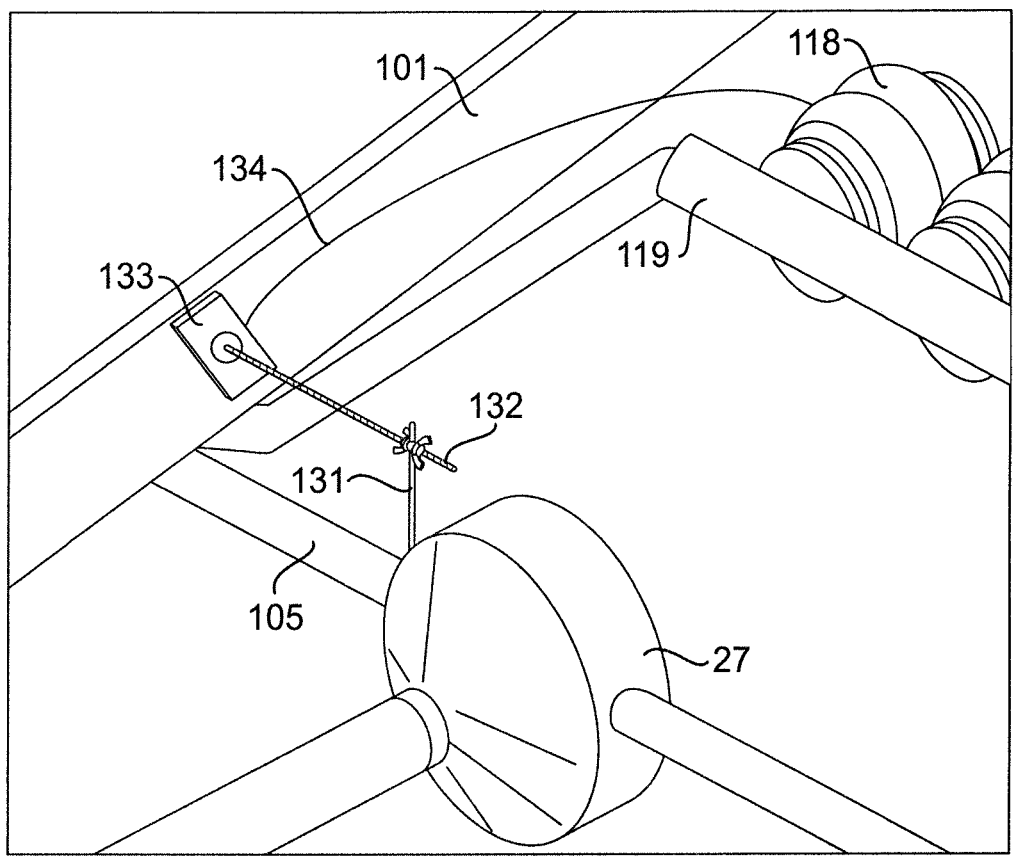
FIG. 6 provides a perspective view of a portion of the air rear suspension shown in FIG. 1 that includes a system for maintaining a ride height.

As shown in FIG. 6, the air rear suspension (100) may include a system for maintaining a ride height, which system may also provide automatic adjustments to the spring curves of the air springs (118). Specifically, the system for maintaining a ride height may include a first control rod (131), a second control rod (132), an air valve (133), and an air line (134). In the depicted embodiment, the first rod (131) may be connected to the differential (27) on one end. Similarly, one end of the second rod (132) may be connected to the air valve (133), which valve may also be connected to the frame (101). The first rod (131) and second rod (132) may be connected to each other, and this connection may be movable. For example, two nuts or other fasteners may be used to position a connecting portion of the first rod (131) along the extent of the second rod (132), as depicted. Further, the air valve (133) may be connected to one end of the air line (134), and the other end of the air line (134) may be connected to the air springs (118).

Generally, the air valve (133) may cause air to be forced into or out of the air springs (118), depending on the orientation of the second control rod (132). For example, in an embodiment, the second control rod (132) may cause the air valve (133) to release air from the air spring (118) as the second control rod (132) is moved upwards by the first control rod (131) and the rear axle (105). In other embodiments, upwards movement of the second control rod (132) may cause the air spring (118) to fill with air. The air from the air valve (133) may be provided by any source known to persons of skill in the art, including stored air in a tank (not depicted) or air provided by a compressor (not depicted).

The system for maintaining a ride height may be operated as follows. First, the user of the automobile (11) may set an initial ride height by altering the connection between the first rod (131) and the second rod (132). Adjustments of the connection may raise or lower the overall height between the rear axle (105) and the frame (101). After this connection has been adjusted, the system for maintaining a ride height will operate without human intervention. As the automobile (11) is driven, the rear axle (105) may encounter an uneven road surface, which surface may include a bump. When the rear tires encounter the bump, the rear axle (105) may move vertically upwards towards the frame (101), while inertia keeps the frame in its original position. This movement of the frame (101) relative to the rear axle (105) will cause the first control rod (131) to push upwards on the second control rod (132). The second control rod (132), in an embodiment, will then cause the air valve (133) to release air pressure within the air spring (118). This reduction in pressure will also reduce the ride height between the frame (101) and the rear axle (105), so that the frame (101) and related body portion (17) are not forced upwards, altering the overall ride height of the automobile (11). As the rear axle (105) lowers again to the ground, the air valve (133) may cause the air springs (118) to reinflate with air, returning to its original adjusted state. Accordingly, the system for maintaining a ride height may operate to maintain a ride height of the automobile (11).

In other embodiments, more or less dampers (114) and/or air springs (118) may be used. Further, the functionality of the dampers (114) and the air springs (118) may be combined into a single unit, or a plurality of units each having damping and spring functions. In any case, the dampers (114) and air springs (118) may have any construction and/or arrangement known to persons of ordinary skill in the art.

The preload adjustment bar (116) may have any shape, size, or material construction known to persons of ordinary skill in the art that is capable of withstanding the forces exerted by the cantilever bar (119) on the preload adjustment bar (116) via the dampers (114) and/or air springs (118). Similarly, the dampers (114), air springs (118), and preload adjustment bar (116) may be made into any shape or size that provides the necessary spring and damping functions, as intended herein.

In other embodiments, other subsystems may be substituted for, or used in combination with, the above-described subsystems. For example, the linkage bar portion (102) may be substituted or supplemented by any system that is capable of constraining the rear axle (105) along a predetermined path. This may include rocker systems, systems having bars or other constraining means on either side of the rear axle (105), or other systems known to persons of ordinary skill in the art. In the depicted embodiment, the linkage bar portion (102) is constructed using two parallel four-bar linkages. In other embodiments, each of the parallel four-bar linkages may be replaced or supplemented with one or more ladder bar connections. And again, each of the parallel four-bar linkages may be replaced or supplemented with one or more other connections known to persons of ordinary skill in the art. The cantilever bar portion (104) may be substituted or supplemented by any system that is capable of translating movement of the rear axle (105) to movement of the shock absorber portion (106). This too may include rocker systems, lever systems, or other systems known to persons of ordinary skill in the art. Finally, the shock absorber portion (106) may be substituted with any system capable of providing the damping and spring functions, such as system that integrates damping into an air spring system.

The qualifier "generally," and similar qualifiers as used in the present case, would be understood by one of ordinary skill in the art to accommodate recognizable attempts to conform a device to the qualified teen, which may nevertheless fall short of doing so. This is because terms such as "orthogonal" are purely geometric constructs and no real-world component or relationship is truly "orthogonal" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The invention claimed is:

1. A rear suspension system for an automobile, the system comprising:
   said automobile including a body, a front axle, and a rear axle;
   a linkage bar connected to said body and to said rear axle;
   a cantilever bar having a first cantilever end and a second cantilever end;
   a damper;
   an air spring; and
   a preload adjustment bar connected between said cantilever bar and said body,
   wherein said preload adjustment bar may be configured to adjust the preload of the air spring,
   wherein said cantilever bar is connected to each of said rear axle and said body at said first cantilever end,
   wherein said cantilever bar is connected to each of said damper and said air spring at said second cantilever end,
   wherein said cantilever bar has a generally U-shape with a flattened valley portion and flared ends, and wherein said flattened valley portion is said second cantilever end and said flared ends are said first cantilever end,
   wherein said damper and said air spring are each connected to said body, and
   wherein said linkage bar and said cantilever bar are each configured to move in response to movement of said rear axle relative to said body.

2. The system of claim 1, wherein a distance between said preload adjustment bar and said body may be varied.

3. The system of claim 2, wherein said distance between said preload adjustment bar and said body may be varied by turning a set screw that connects said preload adjustment bar and said body.

4. The system of claim 3, wherein said damper and said air spring extend in a horizontal direction.

5. The system of claim 4, wherein said rear axle is constrained by said linkage bar to move primarily in a vertical direction.

6. A rear suspension system for an automobile, the system comprising:
   said automobile including a body, a front axle, and a rear axle;
   a linkage bar connected to said body and to said rear axle;
   a cantilever bar having a first cantilever end and a second cantilever end;
   a damper;
   an air spring; and
   an air valve connected to said body and to said rear axle,
   wherein said air valve is configured to substantially maintain a ride height of said body during operation of said automobile by adjusting a volume of air within said air spring,
   wherein said cantilever bar is connected to each of said rear axle and said body at said first cantilever end,
   wherein said cantilever bar is connected to each of said damper and said air spring at said second cantilever end,
   wherein said damper and said air spring are each connected to said body, and wherein said linkage bar and said cantilever bar are each configured to move in response to movement of said rear axle relative to said body.

7. The system of claim 6, further comprising a first link, a second link, and a cantilever bracket,
wherein said cantilever bar is connected to said rear axle via said first link, said second link, and said cantilever bracket,
wherein said cantilever bar and said first link are directly connected,
wherein said first link and said second link are directly connected,
wherein said second link and said cantilever bracket are directly connected, and
wherein said connections between said cantilever bar, said first link, said second link, and said cantilever bracket are configured to allow relative motion between said rear axle and said cantilever bar via rotations at said connections.

8. The system of claim 7, wherein said first link and said cantilever bar are configured such that each may rotate about a cantilever pivot at the connection between said first link and said cantilever bar, such that a rotation of said first link about said cantilever pivot causes a rotation of said cantilever bar about said cantilever pivot.

9. The system of claim 8, wherein said first link and said cantilever bar are formed integrally.

10. The system of claim 7, wherein said rear axle is positioned between said first link and said body.

11. The system of claim 7, wherein said cantilever bar has a generally U-shape with a flattened valley portion and flared ends, and wherein said flattened valley portion is said second cantilever end and said flared ends are said first cantilever end.

12. The system of claim 11, further comprising a preload adjustment bar connected between said cantilever bar and said body, wherein said preload adjustment bar may be configured by a user to adjust the preload of the air spring.

13. The system of claim 12, wherein a distance between said preload adjustment bar and said body may be varied.

14. The system of claim 13, wherein said distance between said preload adjustment bar and said body may be varied by turning a set screw that connects said preload adjustment bar and said body.

15. The system of claim 14, wherein said damper and said air spring extend in a horizontal direction.

16. The system of claim 15, wherein said rear axle is constrained by said linkage bar to move primarily in a vertical direction.

* * * * *